United States Patent [19]

Kaga

[11] Patent Number: 4,795,263
[45] Date of Patent: Jan. 3, 1989

[54] METHOD OF PRODUCING CONCRETE

[75] Inventor: Kikuo Kaga, Tokyo, Japan

[73] Assignees: Sumitomo Corporation, Osaka, Japan; Sobu Ready Mix Concrete Co., Ltd., Sagamihara, Japan

[21] Appl. No.: 700,957

[22] Filed: Feb. 12, 1985

[51] Int. Cl.$^4$ .............................................. B28C 7/04
[52] U.S. Cl. ........................................ 366/8; 366/14; 106/314
[58] Field of Search .................. 106/97, 314, 315; 366/8, 3, 6, 14

[56]  References Cited

U.S. PATENT DOCUMENTS 4,249,948 2/1981 Okada et al. ..................... 106/314
4,403,863 9/1983 Fukushima et al. ................ 366/8

OTHER PUBLICATIONS

Orchard, "Concrete Technology" vol. I, Properties of Materials, 1973, pp. 76-77, Essex, England.

Primary Examiner—William R. Dixon, Jr.
Assistant Examiner—Ann Knab
Attorney, Agent, or Firm—A. W. Breiner

[57]  ABSTRACT

A fine aggregate is stored in a high storage silo and its surface water content is so controlled that its variation may be kept within ±1% by weight. The fine aggregate, cement and primary water containing an air entraining agent are mixed in an upper mixer (primary mixing) to prepare mortar. The mortar, a coarse aggregate and secondary water containing a water reducing agent are mixed in a lower mixer (secondary mixing) to produce mixed concrete.

7 Claims, 2 Drawing Sheets

METHOD OF PRODUCING CONCRETE

BACKGROUND OF THE INVENTION

1. Field of the Invention

This invention pertains to a method of producing concrete. More particularly, it relates to a method which comprises the primary mixing step for preparing mortar by mixing cement, fine aggregates and water and the secondary mixing step for mixing the mortar and coarse aggregates to produce concrete, and which can produce concrete having an excellent slump value and a high degree of strength, while reducing the unit quantity of water required for obtaining the desired consistency.

2. Description of the Prior Art

Concrete shrinks with the evaporation of water during its solidification. The more water it contains, the more heavily it shrinks and the more likely it is to crack and lower its durability.

U.S. Pat. No. 4,403,863 discloses a method of producing concrete by a stationary mixer including an upper mixer which prepare mortar by mixing cement, fine aggregates and water and a lower mixer which receives the mortar from the upper mixer and mixes it with coarse aggregates. This method may be able to achieve some reduction in the quantity of water required for producing concrete, but is not expected to produce concrete which is satisfactory in slump value and compressive strength, since cement begins to solidify in the lower mixer.

SUMMARY OF THE INVENTION

It is an object of this invention to provide a method which can produce concrete of excellent compressive strength by improving the hydration of the surfaces of cement particles, while reducing the quantity of water required.

It is another object of this invention to provide a method which can always produce concrete with a minimum degree of variation in quality.

These objects are attained by a method which comprises the primary mixing step for preparing mortar by mixing cement, fine aggregates and primary water and the secondary mixing step for mixing the mortar with coarse aggregates and secondary water to produce concrete.

According to an important feature of this invention, a variation in the surface water content of the fine aggregates is controlled within ±1% by weight.

According to this invention, it is also important to employ different additives at different stages of production. More specifically, an air entraining agent is added during the primary mixing step, and a water reducing agent during the secondary mixing step.

This invention makes it possible to reduce by about 10 kg/m³ or 5 to 9% the quantity of water required for a conventional method of concrete production by a single step of mixing in a pan type mixer. The concrete produced by the method of this invention is 8 to 12% higher in compressive strength than the conventional product made by a single step of mixing if they have an equal slump height and an equal water to cement ratio. The product of this invention has a water to cement ratio which is 3 to 8% higher than that of the conventional product if they are equal in compressive strength. In other words, this invention enables a reduction of 35 to 60 kg/m³ in the quantity of cement required for concrete production. These reductions in the quantities of water and cement mean a great reduction in the cost of concrete production. Moreover, the method of this invention enables easy and economical production of concrete with a minimum variation in quality.

DETAILED DESCRIPTION OF THE INVENTION

The term "fine aggregate" as herein used means an aggregate which is relatively small in particle size, and typically refers to sand. The term "coarse aggregate" means an aggregate which is relatively large in size, and typically refers to gravel.

According to the method of this invention, the surface water content of a fine aggregate or sand is first controlled. It is preferable to use sand having a particle size not exceeding 5 mm. While the surface water content of the fine aggregate depends on what is used, it is important to ensure that a variation in the surface water content of a specific quantity of fine aggregate used for producing a given amount of concrete be kept within ±1% by weight.

Figure 2:
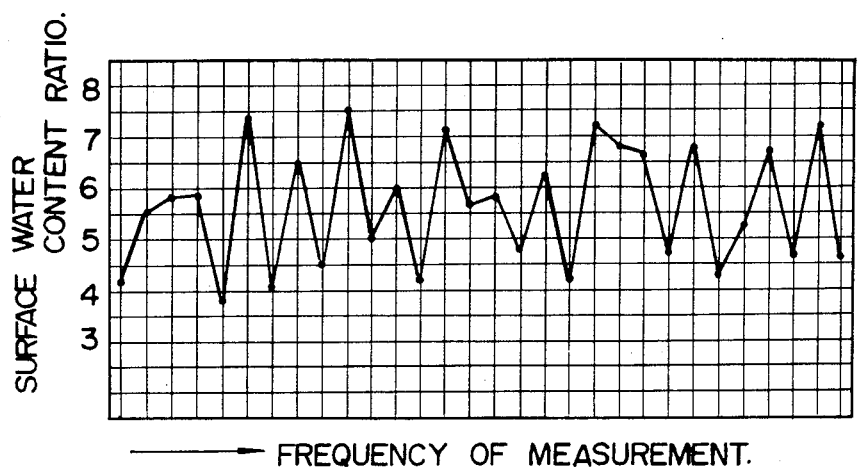
FIG. 2 is a graph showing by way of example a variation in the surface water content of fine aggregates supplied from a conventional stockyard.

The surface water content of the fine aggregate conventionally supplied from a stockyard was measured at regular intervals. The results varied in a wide range of about 3.8% to about 7.6% as shown by way of example in FIG. 2. Sand having a surface water content varying so widely fails to adhere to cement uniformly and results in the production of concrete which lacks uniformity in compressive strength and other properties.

According to this invention, a high storage silo is used to facilitate the control of the surface water content of the fine aggregate. A system which can be used to carry out the method of this invention is shown by way of example in FIG. 1. A fine aggregate is transported by an appropriate means, such as a belt conveyor 1, and water is sprayed on the aggregate by a sprinkler 2 to wet it thoroughly. The wet aggregate is stored in a high storage silo 3 having a height of, for example, 25 m. The fine aggregate in the silo 3 preferably occupies a height of at least 15 m and a volume of at least 250 m³. The aggregate acquires a substantially uniform surface water content varying only within a range of ±1% by weight if it is kept in the silo 3 for at least 48 hours. Although the mechanism by which a uniform surface water content is obtained is not clear, it is very likely that the potential energy of the water on the surfaces of the aggregate particles and the weight of the aggregate particles may cause any excessive water to drop along the surfaces of the particles, while water replaces the air on the particle surfaces to form a uniform and stable water film covering the particles.

Figure 3:
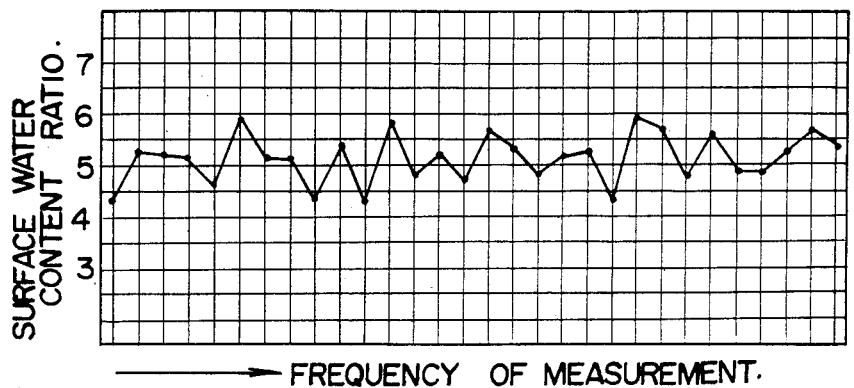
FIG. 3 is a graph showing by way of example a variation in the surface water content of fine aggregates supplied from a high storage silo for controlling their surface water content in accordance with this invention.

The speed at which the excessive water drops until the quantity of water on the surface of the aggregate is stabilized is inversely proportional to the specific surface area of the aggregate and directly proportional to the storage height thereof. It is, therefore, preferable to use a high storage silo and store the aggregate therein so that it may occupy a large height. Thoroughly wetted sand occupying a height of 20 m and a volume of 800 m³ was kept in a storage silo having a height of 25 m for 48 hours. Sand was removed from the silo through its bottom outlet at regular intervals and its surface water content was measured. The results are shown in FIG. 3. As is obvious from FIG. 3, the sand maintained a surface water content of 5% ±1% by weight.

Figure 4:
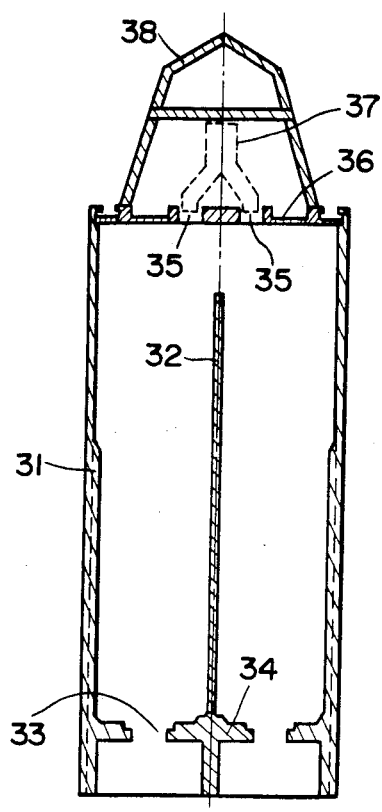
FIG. 4 is a cross sectional view showing by way of example a high storage silo employed in accordance with this invention for controlling the surface water content of fine aggregates.

FIG. 4 shows a high storage silo by way of example. It comprises a casing 31 having a substantially square cross section and divided by a central partition 32 into two compartments. The casing 31 has a floor 34 provided with an outlet opening 33 for the aggregate and a ceiling 36 provided with an inlet opening 35 for the aggregate. The ceiling 36 has a cover 38 enclosing an aggregate feeder 37. It is possible to employ a plurality of silos of such construction disposed in mutually juxtaposed relation.

Figure 1:
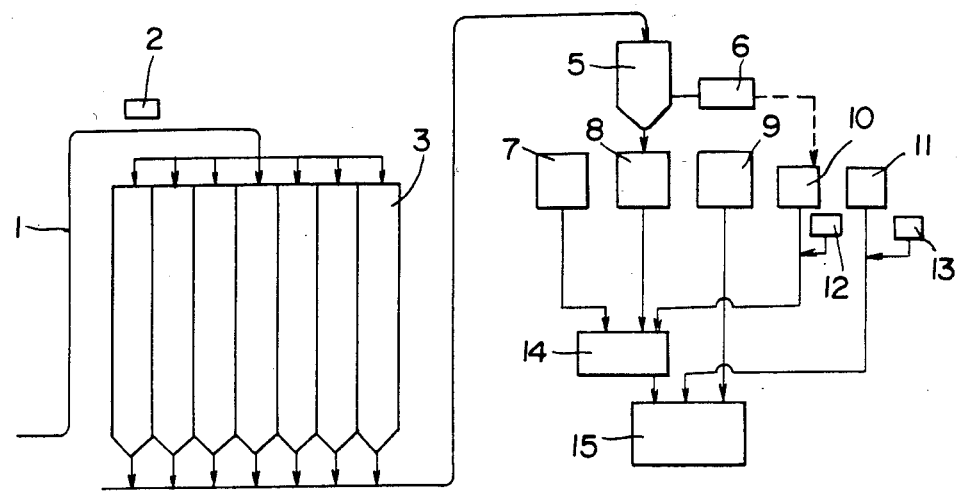
FIG. 1 is a diagrammatic representation of a method of concrete production embodying this invention.

The aggregate having a controlled surface water content is transported into a bin 5 by a belt conveyor 4 and its surface water content is measured by a water content meter 6, as shown in FIG. 1. The aggregate is, then, transferred to an aggregate tank 8. Cement and the aggregate are supplied from a cement tank 7 and the aggregate tank 8, respectively, to an upper mixer 14 for primary mixing. At the same time, or after they have been mixed to some extent, primary water is supplied from a primary water tank 10 to the upper mixer 14 for kneading the cement and aggregate mixture. An air entraining agent is added from a tank 12 to the primary water. It is possible to use any commercially available air entraining agent, including the product of Hercules Powder Co. of U.S.A. which is known under the trademark "Vinsol". It is sufficient to add a quantity which is usually employed. It is preferable to mix the cement and the aggregate and add the primary water containing the air entraining agent to knead the mixture. This procedure has the advantage of achieving a satisfactory adhesive strength between the aggregate having a stabilized surface water content and the cement and an improved air entrainment.

The mortar prepared by the primary mixing step as hereinabove described is transferred from the upper mixer 14 to a lower mixer 15. At the same time, a coarse aggregate is supplied from a coarse aggregate tank 9 to the lower mixer 15. At the same time, or after the mortar and the coarse aggregate have been mixed to some extent, secondary water is supplied from a secondary water tank 11 to the lower mixer 15. The secondary water contains an appropriate amount of a water reducing agent supplied from a water reducing agent tank 13. It is possible to use any commercially available water reducing agent, including Super Plasticizer NP-10 or Water Reducing Agent Pozzlis No. 70 or 5L of Master Builders Co., U.S.A. or Super Plasticizer Mighty FD of Kao Soap Co., Japan. It is preferable to mix the mortar and the coarse aggregate to some extent and add the secondary water containing the water reducing agent to knead the mixture. This procedure enables the full use of the water reducing effect of the water reducing agent and the production of mixed concrete having virtually no slump loss.

As is obvious from the foregoing description, the method of this invention comprises two steps, i.e. the primary mixing step in which mortar is prepared and the secondary mixing step in which concrete is produced. It is characterized by employing a fine aggregate having a controlled surface water content and an air entraining agent and a water reducing agent which are added during the different steps. These features ensure the preparation of mortar having a high water retaining property and an improved adherence of water to a fine aggregate, and thereby enable an improved adhesion of a coarse aggregate to mortar. The method of this invention, therefore, makes it possible to produce at any time concrete which is excellent in compressive strength and durability. It is a very economical method which can produce concrete from a smaller quantity of cement than is required by any conventional method for producing concrete of the same compressive strength.

According to the most preferable embodiment of this invention, cement and a fine aggregate are mixed for a period of 5 to 25 seconds in the upper mixer and primary water containing an air entraining agent is, then, added to the mixture to knead it for at least 25 seconds to prepare mortar. The mortar is, then, mixed with a coarse aggregate in the lower mixer for 5 to 25 seconds and secondary water containing a water reducing agent is added to the mixture to knead it for at least 25 seconds to produce mixed concrete.

While there is no particular limitation to the ratio in quantity of the primary water (including the water on the surfaces of the fine aggregates) to the secondary water, it is preferably in the range of 4:1 to 9:1.

Table I shows by way of example the amounts of the materials used for producing concrete by the most preferable method of this invention as hereinabove described. Table II is similar to Table I, but refer to the conventional method in which cement, fine and coarse aggregates and additives are mixed together in a pan type mixer.

TABLE I

| Nominal strength (kgt/cm²) | W/C ratio[1] (wt. %) | Slump (cm) | S/A ratio[2] (vol. %) | Amounts of the materials (kg/m³) | | | | |
|---|---|---|---|---|---|---|---|---|
| | | | | Cement[3] | Water | Sand | Gravel | AD[4] |
| 180 | 70.5 | 8 | 42.6 | 191 | 135 | 855 | 1,184 | 0.478 |
| | | 18 | 45.5 | 224 | 158 | 873 | 1,075 | 0.560 |
| | | 21 | 48.2 | 241 | 170 | 904 | 998 | 0.602 |
| 210 | 64.5 | 8 | 41.7 | 209 | 135 | 831 | 1,192 | 0.523 |
| | | 18 | 44.5 | 245 | 158 | 847 | 1,083 | 0.613 |
| | | 21 | 47.3 | 264 | 170 | 878 | 1,003 | 0.660 |
| 225 | 62.0 | 8 | 40.9 | 219 | 136 | 811 | 1,202 | 0.548 |
| | | 18 | 43.5 | 258 | 160 | 821 | 1,093 | 0.645 |
| | | 21 | 46.2 | 277 | 172 | 850 | 1,016 | 0.693 |
| 270 | 53.5 | 8 | 40.4 | 256 | 137 | 787 | 1,192 | 0.640 |

TABLE I-continued

| Nominal strength (kgt/cm²) | W/C ratio[1] (wt. %) | Slump (cm) | S/A ratio[2] (vol. %) | Amounts of the materials (kg/m³) | | | | |
|---|---|---|---|---|---|---|---|---|
| | | | | Cement[3] | Water | Sand | Gravel | AD[4] |
| | | 18 | 42.9 | 303 | 162 | 790 | 1,083 | 0.758 |
| | | 21 | 45.5 | 325 | 174 | 816 | 1,005 | 0.813 |
| 300 | 50.0 | 8 | 39.8 | 258 | 138 | 774 | 1,200 | 0.645 |
| | | 15 | 40.9 | 284 | 152 | 772 | 1,144 | 0.710 |
| | | 18 | 42.0 | 307 | 164 | 772 | 1,093 | 0.768 |

TABLE II

| Nominal strength (kgt/cm²) | W/C ratio[1] (wt. %) | Slump (cm) | S/A ratio[2] (vol. %) | Amounts of the materials (kg/m³) | | | | |
|---|---|---|---|---|---|---|---|---|
| | | | | Cement[3] | Water | Sand | Gravel | AD[4] |
| 180 | 62.5 | 8 | 42.6 | 232 | 145 | 829 | 1,149 | 0.580 |
| | | 18 | 45.5 | 269 | 168 | 844 | 1,039 | 0.672 |
| | | 21 | 48.2 | 288 | 180 | 873 | 963 | 0.720 |
| 210 | 58 | 8 | 41.7 | 250 | 145 | 805 | 1,158 | 0.625 |
| | | 18 | 44.5 | 290 | 168 | 818 | 1,048 | 0.725 |
| | | 21 | 47.3 | 310 | 180 | 847 | 972 | 0.775 |
| 255 | 52.5 | 8 | 40.9 | 278 | 146 | 780 | 1,158 | 0.695 |
| | | 18 | 43.5 | 324 | 170 | 785 | 1,048 | 0.810 |
| | | 21 | 46.2 | 347 | 182 | 811 | 972 | 0.868 |
| 270 | 50 | 8 | 40.4 | 294 | 147 | 764 | 1,158 | 0.735 |
| | | 18 | 42.9 | 342 | 172 | 767 | 1,048 | 0.855 |
| | | 21 | 45.5 | 368 | 184 | 790 | 972 | 0.920 |
| 300 | 47 | 8 | 39.8 | 315 | 148 | 743 | 1,158 | 0.788 |
| | | 15 | 40.9 | 345 | 162 | 741 | 1,098 | 0.862 |
| | | 18 | 42.0 | 370 | 174 | 738 | 1,048 | 0.925 |

NOTES:
[1] W/C ratio = Water/Cement ratio;
[2] S/A ratio = Sand/water reducing agent ratio;
[3] Containing 10% by weight of flyash;
[4] AD = Water reducing agent Pozzolis No. 70;

As is obvious from these tables, the concrete produced by the method of this invention contains about 10 kg/m³ less water than the product of the conventional method. The concrete produced by the method of this invention is 8 to 12% higher in compressive strength than the product of the conventional method having the same slump value and the same water to cement ratio. Accordingly, the concrete produced by the method of this invention has a water to cement ratio which is 3 to 8% higher than that of the product of the conventional method having the same compressive strength. In view of a reduction in the amount of water required, the increase of 3 to 8% in the water to cement ratio means a reduction of 35 to 60 kg/m³ in the amount of cement required.

The invention will now be described with reference to several examples thereof.

EXAMPLES 1 TO 4

A series of tests were conducted by varying the timing for the addition of a water reducing agent during the production of concrete by a two-stage stationary mixer including an upper mixer and a lower mixer. The upper mixer was charged with 245 kg of cement and 847 kg of sand and after they had been mixed for five seconds, 126 kg of primary water containing 30 cc of an air entraining agent known as Vinsol were added to knead the mixture for 25 seconds to prepare mortar. The mortar and 1,083 kg of gravel were placed in the lower mixer and mixed together. Thirty-two kilograms (32 kg) of secondary water containing 2,450 cc of a water reducing agent known as Pozzolis No. 5L were added (1) simultaneously with gravel (EXAMPLE 1), (2) five seconds after gravel (EXAMPLE 2), (3) 15 seconds after gravel (EXAMPLE 3) and (4) 25 seconds after gravel (EXAMPLE 4), respectively. The concrete thereby obtained was tested for compressive strength three, seven and 28 days after its production. The results are shown in Table III. Each value of compressive strength is the average of the results of the tests which were repeated several times.

TABLE III

| Example No. | Slump (cm) | Air (%) | Compressive strength (kg/cm²) | | |
|---|---|---|---|---|---|
| | | | 3 days | 7 days | 28 days |
| 1 | 18.5 | 4.5 | 81 | 163 | 248 |
| 2 | 18.5 | 4.6 | 79 | 160 | 245 |
| 3 | 18.5 | 4.6 | 80 | 159 | 243 |
| 4 | 18.5 | 4.5 | 82 | 165 | 253 |

What is claimed is:

1. In a method of producing mixed concrete including a first mixing step for preparing mortar by mixing cement, a fine aggregate and primary water; and a second mixing step for mixing said mortar with a coarse aggregate and secondary water to produce mixed concrete, the improvement which comprises providing a fine aggregate wetted with water for use in said first mixing step and controlling the surface water content of said fine aggregate prior to its use in said first mixing step so that the variation in water content is kept within ±1% by weight, adding an air entraining agent during said first mixing step, and adding a water reducing agent during said second mixing step.

2. A method as set forth in claim 1, wherein said fine aggregate is wetted with water and kept for at least 48 hours in a mass having a height of at least 15 m in a high storage silo prior to its supply for said first mixing step.

3. A method as set forth in claim 2, wherein said mass of said fine aggregate in said silo has a volume of at least 250 m³.

4. A method as set forth in claim 1, wherein said primary water contains said air entraining agent and is added to a mixture of said cement and said fine aggregate.

5. A method as set forth in claim 4, wherein said mixture is obtained by mixing said cement and said fine aggregate for a period of 5 to 25 seconds.

6. A method as set forth in claim 1 or 4, wherein said secondary water contains said water reducing agent and is added to a mixture of said mortar and said coarse aggregate.

7. A method as set forth in claim 6, wherein said mixture of said mortar and said coarse aggregate is obtained by mixing them for a period of 5 to 25 seconds.

* * * * *